United States Patent
Tsutsumi et al.

(10) Patent No.: US 9,767,965 B2
(45) Date of Patent: Sep. 19, 2017

(54) ELECTRIC STORAGE DEVICE, AND ELECTRIC STORAGE APPARATUS

(71) Applicant: GS Yuasa International Ltd., Kyoto-shi (JP)

(72) Inventors: Masakazu Tsutsumi, Kyoto (JP); Jun Nakamura, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 222 days.

(21) Appl. No.: 14/183,456

(22) Filed: Feb. 18, 2014

(65) Prior Publication Data

US 2014/0315071 A1    Oct. 23, 2014

(30) Foreign Application Priority Data

Feb. 20, 2013   (JP) ................. 2013-031292

(51) Int. Cl.
| | |
|---|---|
| *H01M 2/02* | (2006.01) |
| *H01G 11/78* | (2013.01) |
| *H01M 2/04* | (2006.01) |
| *H01M 10/04* | (2006.01) |
| *H01M 10/0525* | (2010.01) |
| *H01M 10/058* | (2010.01) |

(52) U.S. Cl.
CPC ............ *H01G 11/78* (2013.01); *H01M 2/024* (2013.01); *H01M 2/0207* (2013.01); *H01M 2/0217* (2013.01); *H01M 2/0285* (2013.01); *H01M 2/043* (2013.01); *H01M 2/0426* (2013.01); *H01M 2/0473* (2013.01); *H01M 2/0486* (2013.01); *H01M 10/0413* (2013.01); *H01M 10/058* (2013.01); *H01M 10/0525* (2013.01); *Y02E 60/13* (2013.01)

(58) Field of Classification Search
CPC ..... H01G 11/78; H01M 2/0207; H01M 2/024
USPC .......................................... 429/156
See application file for complete search history.

(56) References Cited

U.S. PATENT DOCUMENTS

| | | | |
|---|---|---|---|
| 3,077,509 A * | 2/1963 | Broussard ........... | H01M 2/0242 215/355 |
| 6,573,000 B1 * | 6/2003 | Miyazaki ............ | H01M 2/0439 429/163 |
| 6,746,798 B1 | 6/2004 | Hiratsuka et al. | |
| 8,518,579 B2 | 8/2013 | Kim et al. | |
| 8,623,545 B2 | 1/2014 | Kim et al. | |
| 2006/0110538 A1 | 5/2006 | Yokoi et al. | |
| 2006/0263685 A1 | 11/2006 | Kwon | |

(Continued)

FOREIGN PATENT DOCUMENTS

| | | |
|---|---|---|
| JP | 10-269999 A | 10/1998 |
| JP | 2002-184379 A | 6/2002 |

(Continued)

*Primary Examiner* — Patrick Ryan
*Assistant Examiner* — Victoria Lynch
(74) *Attorney, Agent, or Firm* — McGinn IP Law Group, PLLC

(57) ABSTRACT

An electric storage device according to the present invention includes a case having a case body and a cover plate, the cover plate has a projection to be inserted into the opening of the case body, the projection is in contact with or adjacent to the inner surface of the opening edge of the case body in the second direction, and the projection is locally located in the vicinity of the circumferential edge of the cover plate.

26 Claims, 21 Drawing Sheets

(56) References Cited

U.S. PATENT DOCUMENTS

| | | |
|---|---|---|
| 2010/0233528 A1 | 9/2010 | Kim et al. |
| 2011/0039152 A1 | 2/2011 | Kim et al. |
| 2011/0250485 A1 | 10/2011 | Tsukuda |
| 2012/0321922 A1 | 12/2012 | Kim et al. |

FOREIGN PATENT DOCUMENTS

| | | | |
|---|---|---|---|
| JP | 2002-329484 A | 11/2002 | |
| JP | 2005-332700 A | 12/2005 | |
| JP | 2006-156124 A | 6/2006 | |
| JP | 2006-310293 A | 11/2006 | |
| JP | 2010-212240 A | 9/2010 | |
| JP | 2010-225372 A | 10/2010 | |
| JP | 2011-40381 A | 2/2011 | |
| JP | 2011-204396 A | 10/2011 | |
| JP | 2011-238504 A | 11/2011 | |
| JP | 2012-104414 A | 5/2012 | |
| JP | 2012-199021 A | 10/2012 | |
| JP | 2013-091085 A | 5/2013 | |
| JP | 2013-105674 A | 5/2013 | |
| JP | 2014-038812 A | 2/2014 | |

\* cited by examiner

ELECTRIC STORAGE DEVICE, AND ELECTRIC STORAGE APPARATUS

CROSS-REFERENCE TO RELATED APPLICATION

This application claims priority to Japanese Patent Application No. 2013-031292, the disclosure of which is incorporated herein by reference in its entirety.

FIELD

The present invention relates to an electric storage device including an electrode assembly and a case provided with a case body that houses the electrode assembly and a cover plate that covers an opening of the case body, and to an electric storage apparatus including such an electric storage device.

BACKGROUND

In recent years, rechargeable electric storage devices such as battery cells (lithium ion battery cells, nickel hydrogen battery cells, etc.) and capacitors (electric double layer capacitors, etc.) are employed as a power source, for example, for vehicles (automobiles, motorcycles, etc.) and various equipment (mobile terminals, laptop computers, etc.).

For example, a battery cell (rectangular battery cell) disclosed in Patent Literature 1 includes an electrode assembly (battery element), a case body (body case) that houses the electrode assembly, and a cover plate (cover) that closes an opening of the case body. The cover plate is provided with a step portion projecting toward the inside of the case body. Such a step portion allows the cover plate to be positioned at a specific position at the opening of the case body. This battery case is sealed by fitting the cover plate into the opening of the case body.

In Patent Literature 1, the step portion as an area excluding the circumferential edge portion of the cover plate planarly projects uniformly toward the inside of the case body. Therefore, a capacity equivalent to the volume of the step portion cannot be used as a capacity capable of housing the electrode assembly inside the case. That is, the capacity equivalent to the volume of the step portion is lost from the capacity inside the case. A reduction in the capacity inside the case causes a reduction in the space to house the electrode assembly that contributes to the electricity storage by the battery cell. $_{[n1]}$Therefore the electric storage capacity per unit volume of the battery cell is reduced.

Such problems are not limited to batteries, and the same problems apply also to capacitors (such as electric double layer capacitors).

CITATION LIST

Patent Literature 1: JP 10(1998)-269999 A

SUMMARY

The present invention aims to provide an electric storage device and an electric storage apparatus capable of positioning a cover plate at a specific position at an opening of a case body while suppressing a reduction in capacity inside the case.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An electric storage device according to an aspect of the present invention includes: an electrode assembly comprising a positive electrode plate and a negative electrode plate that are insulated from each other; and a case that houses the electrode assembly, wherein the case includes a case body having an opening in a first direction, and a cover plate that is placed on an opening edge of the opening of the case body so as to cover the opening, the cover plate includes a projection that is inserted into the opening of the case body, and the projection is in contact with or adjacent to an inner surface of the opening edge of the case body at least in a second direction, which is orthogonal to the first direction, and is locally located in a vicinity of a circumferential edge of the cover plate.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
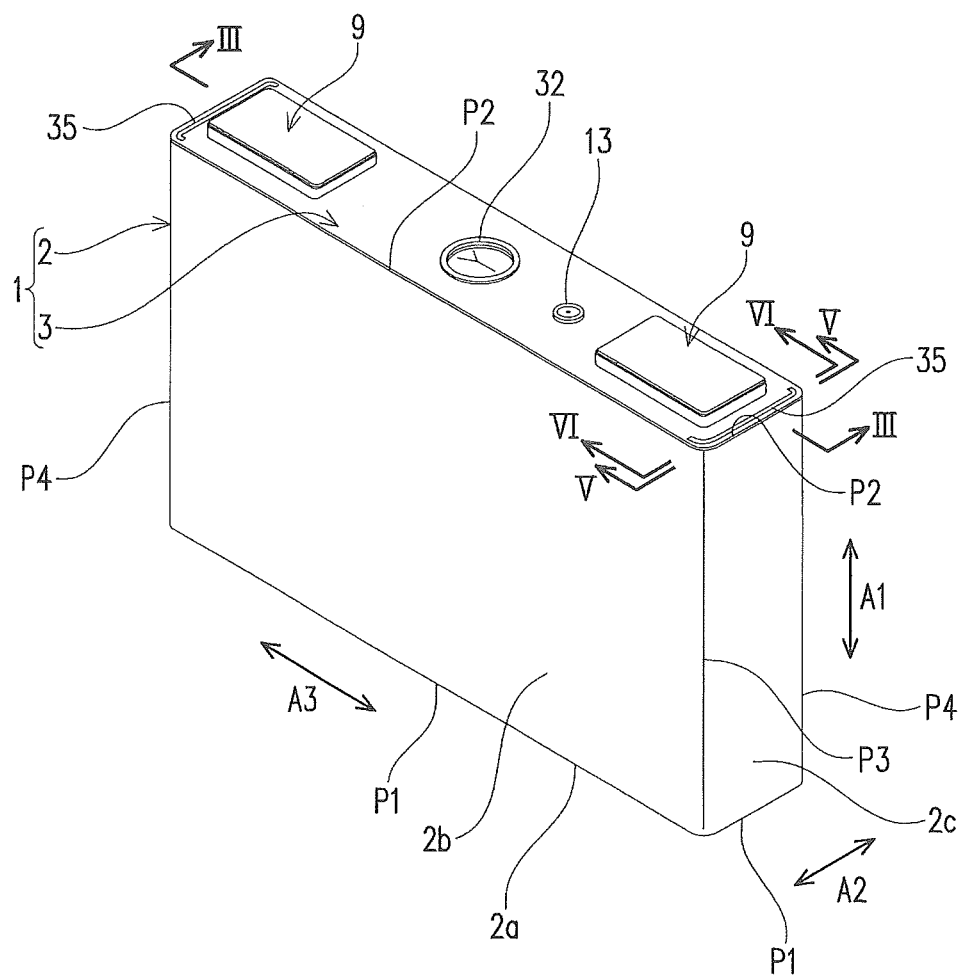
FIG. 1 is a perspective view of a battery cell according to an embodiment of the present invention.

The electric storage device according to an aspect of this embodiment includes: an electrode assembly including a positive electrode plate and a negative electrode plate that are insulated from each other; and a case that houses the electrode assembly, wherein the case includes a case body having an opening in a first direction, and a cover plate that is placed on an opening edge of the opening of the case body so as to cover the opening, the cover plate includes a projection that is inserted into the opening of the case body, and the projection is in contact with or adjacent to an inner surface of the opening edge of the case body at least in a second direction, which is orthogonal to the first direction, and is locally located in a vicinity of a circumferential edge of the cover plate.

According to such a configuration, when the cover plate is placed on the opening edge of the opening of the case body, the projection of the cover plate is in contact with or adjacent to the inner surface of the opening edge of the opening of the case body in the second direction. Therefore, the cover plate is positioned with respect to the opening of the case body in the second direction. The projection is partially provided on the cover plate in a portion that is in contact with or adjacent to the inner surface of the opening edge of the case body in the second direction. Therefore, only a capacity equivalent to the volume of the projection is lost partially from the capacity of the case, and thus the capacity inside the case is not significantly reduced.

According to another aspect, the electric storage device of this embodiment may have a configuration in which the cover plate includes a recess on an outer surface side of the portion where the projection is provided.

The weight of the cover plate may well increase due to providing the projection by the amount corresponding to the volume of the projection. However, according to the cover plate with the above-mentioned configuration, the recess is provided on the outer surface side of the portion where the projection is provided. Therefore, a weight equivalent to the capacity of the recess is reduced from the weight of the cover plate. Accordingly, the increase in the weight of the cover plate due to providing the projection on the cover plate is suppressed by the recess.

According to another aspect, the electric storage device of this embodiment may have a configuration in which the case body has a bottomed quadrangular tubular shape, and the projection is at least partially in contact with or adjacent to each of a pair of opposed sides of the opening edge of the case body.

According to such a configuration, when the cover plate is placed on the opening edge of the opening of the case body, the projection of the cover plate is in contact with or adjacent to the inner side of each of the pair of opposed sides of the opening edge of the case body. Therefore, the cover plate is positioned in a direction intersecting the pair of sides at the opening of the case body. The projection is partially formed corresponding to each of the pair of sides of the opening edge of the case body. Therefore, only a capacity equivalent to the volume of the projection is lost partially from the capacity of the case, and thus the capacity inside the case is not significantly reduced.

In this case, the projection may be configured so as to be at least partially in contact with or adjacent to each of one pair of opposed sides of the opening edge of the case body and each of the other pair of opposed sides thereof.

According to such a configuration, when the cover plate is placed on the opening edge of the opening of the case body, the projection of the cover plate is in contact with or adjacent to the inner side of each of the one pair of opposed sides and the other pair of opposed sides of the opening edge of the case body. Therefore, the cover plate is positioned with respect to the opening of the case body in a direction parallel to the one pair of sides and in a direction intersecting the one pair of sides. The projection is at least partially formed at positions corresponding to each of the one pair of opposed sides and each of the other pair of opposed sides of the opening edge of the case body. Therefore, only a capacity equivalent to the volume of the projection is lost partially from the capacity of the case, and thus the capacity inside the case is not significantly reduced.

According to another aspect, the electric storage device of this embodiment may have a configuration in which the case body has an opening edge of a rectangular shape having a plurality of corner portions, and a plurality of sides that connect between adjacent ones of the plurality of corner portions, and the projection is in contact with or adjacent to at least one of the plurality of corner portions.

According to such a configuration, when the cover plate is placed on the opening edge of the opening of the case body, the projection of the cover plate is in contact with or adjacent to at least one of the plurality of corner portions of the opening edge of the case body. Therefore, the cover plate is positioned with respect to the opening of the case body. The projection is formed corresponding to at least one of the plurality of corner portions of the opening edge of the case body. Therefore, only a capacity equivalent to the volume of the projection is lost partially from the capacity of the case, and thus the capacity inside the case is not significantly reduced.

According to still another aspect, the electric storage device of this embodiment may have a configuration in which the projection has an annular shape that extends along the opening edge of the case body.

According to such a configuration, when the cover plate is placed on the opening edge of the opening of the case body, the projection of the cover plate is in contact with or adjacent to the inner side of the opening edge of the case body. Therefore, the cover plate is positioned with respect to the opening of the case body. The projection is formed to have an annular shape that extends along the inner side of the opening edge of the case body. Therefore, only a capacity equivalent to the volume of the projection is lost partially from the capacity of the case, and thus the capacity inside the case is not significantly reduced.

According to still another aspect, the electric storage device of this embodiment may have a configuration in which the projection has an outer circumferential edge spaced at a distance from the inner surface of the opening edge.

According to still another aspect, the electric storage device of this embodiment may have a configuration in which the projection has an outer circumferential edge spaced at a distance from the circumferential edge of the cover plate in plan view.

According to still another aspect, the electric storage device of this embodiment may have a configuration in which the projection is in contact with or adjacent to a portion of the inner surface of the opening edge of the case body rather than an entirety of the inner surface of the opening edge of the case body.

According to such a configuration, when the cover plate is placed on the opening edge of the opening of the case body, the projection of the cover plate is in contact with or adjacent to the portion of the inner surface of the opening edge of the case body. Therefore, the cover plate is positioned with respect to the opening of the case body. The projection is formed at a position corresponding to the portion of the inner surface of the opening edge of the case body. Therefore, only a capacity equivalent to the volume of the projection is lost partially from the capacity of the case, and thus the capacity inside the case is not significantly reduced.

According to still another aspect, the electric storage device of this embodiment may have a configuration in which a recess is provided in an area of an upper surface of the cover plate that opposes the projection provided on a lower surface of the cover plate.

The weight of the cover plate may well increase due to providing the projection on the cover plate by the amount corresponding to the volume of the projection. However, according to the cover plate with the above-mentioned configuration, the recess is provided in the area of the upper surface of the cover plate that opposes the projection provided on the lower surface of the cover plate. Therefore, a weight equivalent to the capacity of the recess is reduced from the weight of the cover plate. Accordingly, the increase in weight of the cover plate due to providing the projection on the cover plate is suppressed by the recess.

In this case, the recess may be configured to overlap with the projection in plan view.

According to still another aspect, the electric storage device of this embodiment may have a configuration in which the projection has a linear shape that extends along the opening edge of the case body.

According to still another aspect, the electric storage device of this embodiment may have a configuration in which the projection has a tip in the projecting direction with an arcuate cross section.

According to such a configuration, it is possible to suppress the generation of metal powder, etc., due to the abrasion between the projecting ridge and the inner side of the case body when the cover plate is fitted into the case body.

An electric storage apparatus according to an aspect of this embodiment includes: at least two electric storage devices including at least one electric storage device according to any one of the above-described aspects; and a coupling member that couples the at least two electric storage devices to each other.

According to such a configuration, in at least one electric storage device, when the cover plate is placed on the opening edge of the opening of the case body, the projection of the cover plate is in contact with or adjacent to the inner surface of the opening edge of the opening of the case body in the second direction. Therefore, in the at least one electric storage device, the cover plate is positioned with respect to the opening of the case body in the second direction. Further, the projection is partially provided on the cover plate in a portion that is in contact with or adjacent to the inner surface of the opening edge of the case body in the second direction. Therefore, in the at least one electric storage device, only a capacity equivalent to the volume of the projection is lost partially from the capacity of the case, and thus the capacity inside the case is not significantly reduced.

The electric storage device of an aspect of this embodiment includes: an electrode assembly including a positive electrode plate and a negative electrode plate that are insulated from each other; and a case that houses the electrode assembly, wherein the case includes a case body having an opening, and a cover plate that is placed on an opening edge of the opening of the case body so as to cover the opening, the cover plate has a projection that projects from the lower surface of the cover plate, the projection is in contact with or adjacent to an inner surface of the opening edge of the case body, and the projection has an outer circumferential edge spaced at a distance from the circumferential edge of the cover plate.

According to such a configuration, when the cover plate is placed on the opening edge of the opening of the case body, the projection of the cover plate is in contact with or adjacent to the inner surface of the opening edge of the opening of the case body. Therefore, the cover plate is positioned with respect to the opening of the case body.

According to another aspect, the electric storage device of this embodiment may have a configuration in which the projection has an outer circumferential edge spaced at a distance from the inner surface of the opening edge.

According to still another aspect, the electric storage device of this embodiment may have a configuration in which the projection is in contact with or adjacent to a portion of the inner surface of the opening edge of the case body rather than an entirety of the inner surface of the opening edge of the case body.

According to such a configuration, the projection is in contact with or adjacent to the portion of the inner surface of the opening edge of the case body rather than the entirety of the inner surface of the opening edge of the case body. Therefore, only a capacity equivalent to the volume of the projection is lost partially from the capacity of the case, and thus the capacity inside the case is not significantly reduced.

According to still another aspect, the electric storage device of this embodiment may have a configuration in which a recess is provided in an area of an upper surface of the cover plate that opposes the projection.

The weight of the cover plate may well increase due to providing the projection on the cover plate by the amount corresponding to the volume of the projection. However, according to the cover plate with the above-mentioned configuration, the recess is provided in the area of the upper surface of the cover plate that opposes the projection. Therefore, a weight equivalent to the capacity of the recess is reduced from the weight of the cover plate. Accordingly, the increase in weight of the cover plate due to providing the projection on the cover plate is suppressed by the recess.

In this case, the recess may be configured to overlap with the projection in plan view.

According to still another aspect, the electric storage device of this embodiment may have a configuration in which the projection has a linear shape that extends along the opening edge of the case body.

According to still another aspect, the electric storage device of this embodiment may have a configuration in which the projection has a tip in the projecting direction with an arcuate cross section.

According to another aspect, an electric storage apparatus of this embodiment includes: at least two electric storage devices including at least one electric storage device according to any one of the above-described aspects; and a coupling member that couples the at least two electric storage devices to each other.

According to such a configuration, in at least one electric storage device, when the cover plate is placed on the opening edge of the opening of the case body, the projection of the cover plate is in contact with or adjacent to the inner side of the opening edge of the opening of the case body. Therefore, in the at least one electric storage device, the cover plate is positioned with respect to the opening of the case body.

As has been described above, these embodiments allow the cover plate to be positioned at a specific position in the opening of the case body while suppressing a reduction in the capacity inside the case.

Hereinafter, a battery cell as one embodiment of the electric storage device according to the present invention is described with reference to the drawings. The battery cell according to this embodiment is a non-aqueous electrolyte secondary battery cell, more specifically, a lithium ion secondary battery cell. As shown in FIG. 1 to FIG. 7, the battery cell according to this embodiment includes a case 1 composed of a case body 2 having an opening, and a cover plate 3 that is placed on an opening edge of the opening of the case body 2 so as to close and seal the opening of the case body 2. Further, the cover plate 3 is provided with a terminal structure 9 that is electrically connected with an electrode assembly 4 housed within the case 1.

Figure 2:
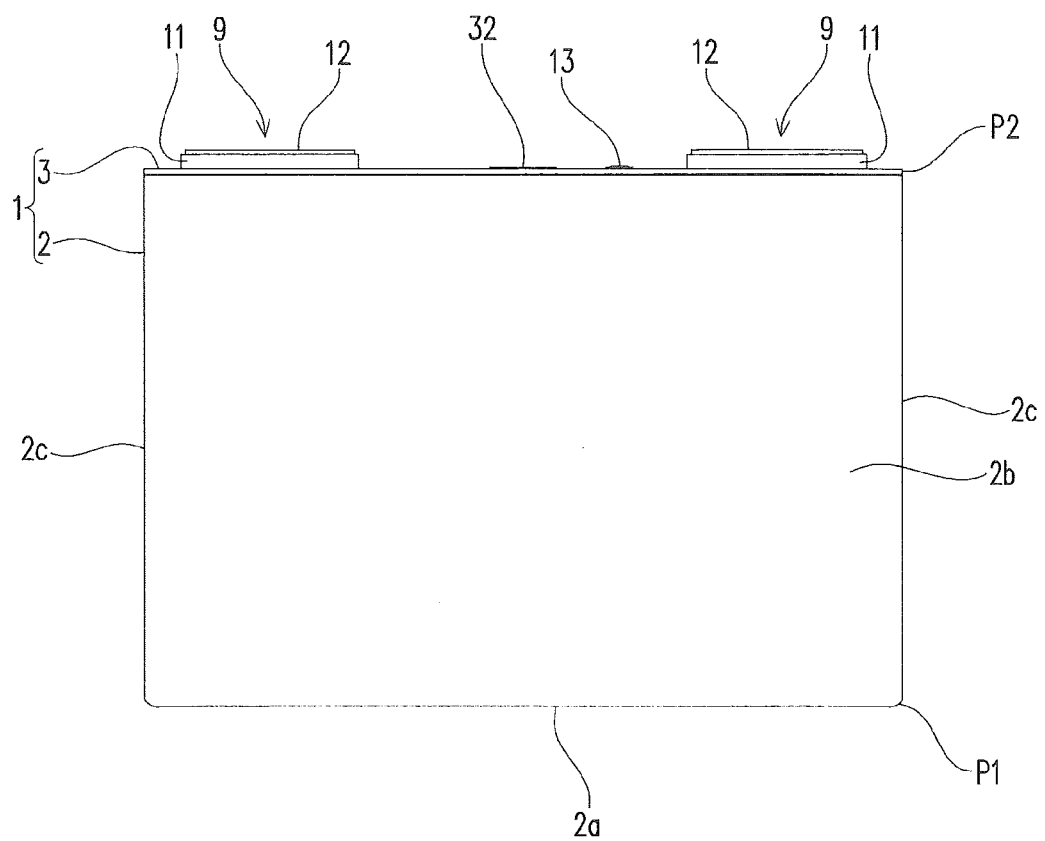
FIG. 2 is a side view of the battery cell.
Figure 3:
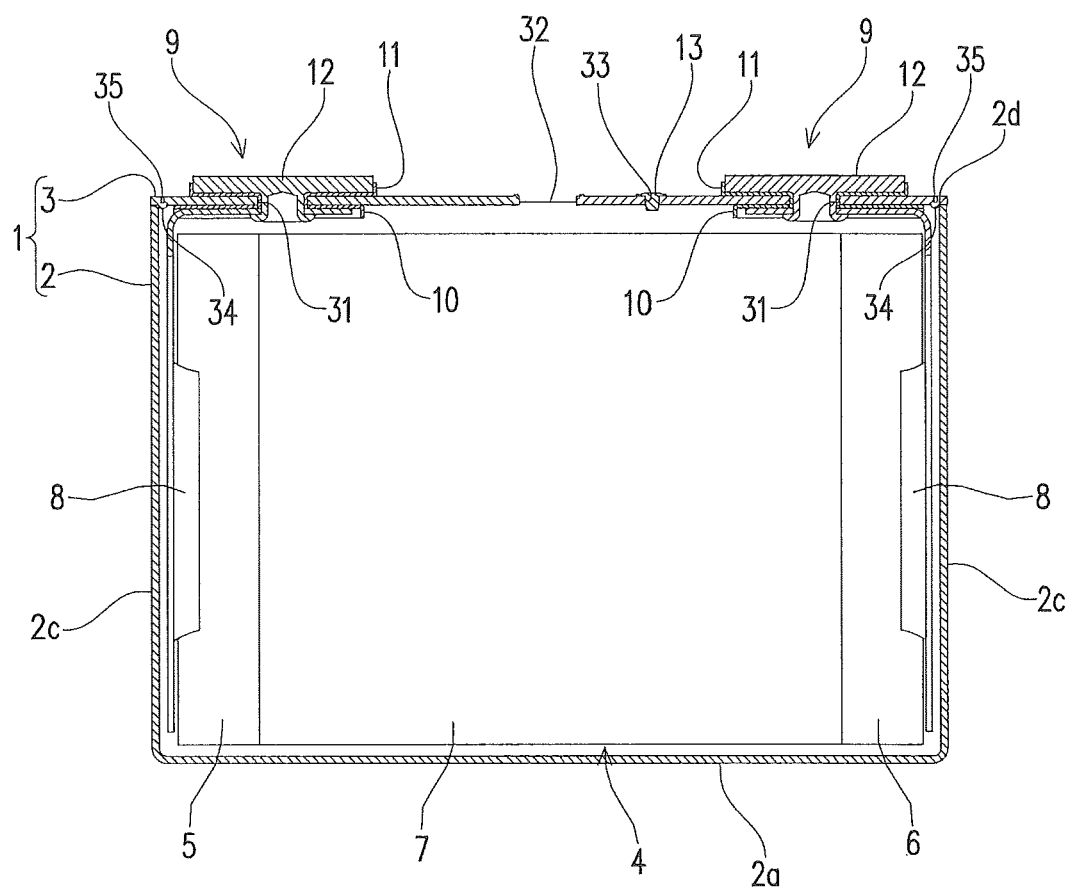
FIG. 3 is a sectional view taken along the line III-III in FIG. 1.

The case body 2 and the cover plate 3 of the case 1, for example, are made of aluminum or an aluminum-based metal material such as aluminum alloy. As shown in FIG. 1 to FIG. 3, the case body 2 has a bottomed rectangular tubular shape that is flattened in the width direction so as to house the electrode assembly 4 of a wound type with an elongated cylindrical shape. The cover plate 3 is a plate member having a rectangular shape corresponding to the shape of the opening of the case body 2.

The case body 2 has a pair of opposed side plates 2b and a pair of opposed end plates 2c that are erected at the circumference edge of a rectangular bottom 2a in the first direction A1 (height direction). The pair of end plates 2c are erected at the edge of the bottom 2a that extends along a second direction A2 that is the short direction of the rectangular bottom 2a. The pair of side plates 2b are erected at the edge of the bottom 2a that extends along a third direction A3 that is the longitudinal direction of the bottom 2a. The case body 2 is formed to have a thin bottomed quadrangular tubular shape with a small depth by having the pair of end plates 2c with a smaller width than the pair of side plates 2b. In the present embodiment, "the second direction A2" and "the third direction A3" correspond to "the second direction, which is orthogonal to the first direction" of the present invention. Further, the second direction of the present invention is not limited to "the second direction A2" of this embodiment, and is not intended to exclude "the third direction A3" of this embodiment.

The pair of side plates 2b each have a first side P1 provided on the bottom 2a side, a second side P2 opposing the first side P1, and a pair of sides P3 and P4 extending along the first direction A1. The pair of end plates 2c each have a first side P1 provided on the bottom 2a side, a second side P2 opposing the first side P1, and a pair of sides P3 and P4 extending along the first direction A1, as the side plates 2b. An opening 2d corresponding to the bottom 2a is formed in the region surrounded by the second sides P2 of the pair of side plates 2b and the second sides P2 of the pair of end plates 2c.

Figure 4:
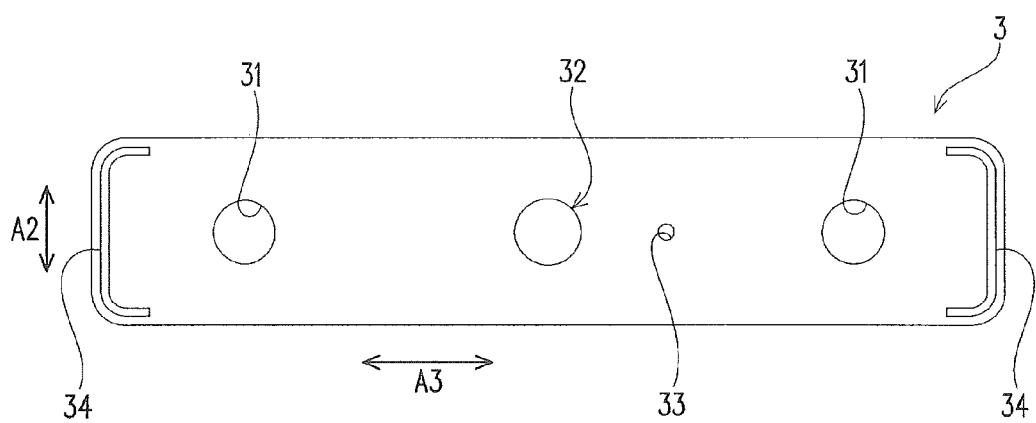
FIG. 4 is a bottom view of a cover plate of a case of the battery cell.

As shown in FIG. 4, the cover plate 3 has a rectangular shape. Two through holes 31 are formed in the cover plate 3 at intervals in the third direction A3.

As shown in FIG. 1 to FIG. 4, a circular gas discharge valve 32 is formed integrally with the cover plate 3 at the center of the cover plate 3. A thin portion having a substantially Y-shape is formed in the gas discharge valve 32. The gas discharge valve 32 reduces the pressure in the case 1 by splitting the thin portion in the case where the internal pressure of the case 1 unusually increases. An injection hole 33 with a small diameter is formed in the cover plate 3 on a lateral side of the gas discharge valve 32. This injection hole 33 is closed by a stopper 13 after an electrolyte liquid is injected into the case 1.

Figure 5:
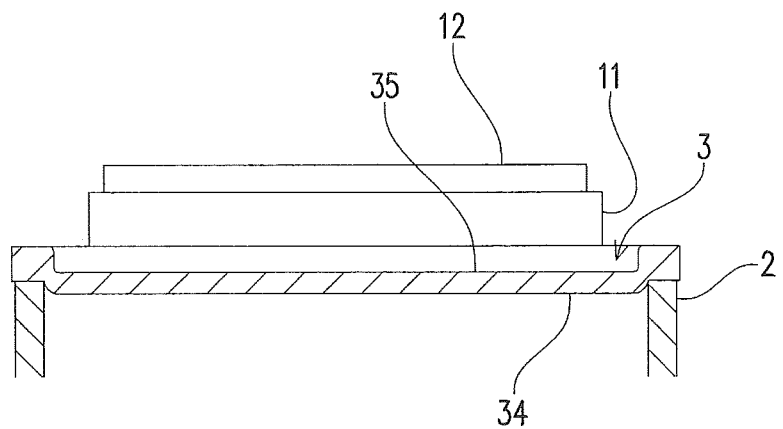
FIG. 5 is an enlarged sectional view, taken along the line V-V in FIG. 1, of the cover plate.
Figure 6:
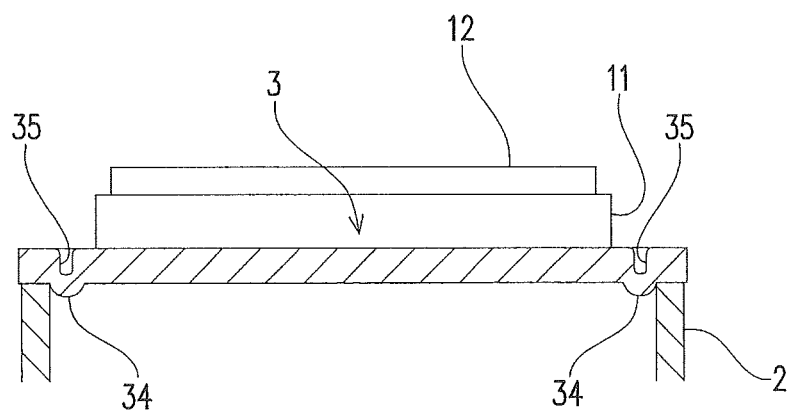
FIG. 6 is an enlarged sectional view, taken along the line VI-VI in FIG. 1, of the cover plate.

As shown in FIG. 5 and FIG. 6, the cover plate 3 includes a projection that opposes the opening edge of the case body 2 on the inner side of the case 1. In this embodiment, a projecting ridge 34 that projects linearly from the cover plate 3 is described as an example of the projection. The projecting ridge 34 (projection) is locally located in the vicinity of the circumference edge of the cover plate 3 on the lower surface of the cover plate 3. This projecting ridge 34 is formed at each of the positions corresponding to the second sides P2 of the pair of end plates 2c. The projecting ridge 34 is provided on the cover plate 3 so as to be in contact with the inner surface of the opening edge 2d of the case body 2. More specifically, the projecting ridge 34 is provided along each of the second sides P2 of the end plates 2c on the cover plate 3 inside the regions of the circumference edge portion that abut the opening edge of the case body 2. Both ends of the projecting ridge 34 reach portions of the second sides P2 of the pair of side plates 2b. The projecting ridge 34 projects from the cover plate 3 toward the inside of the case body 2 along the pair of end plates 2c of the case body 2. The projecting ridge 34 is formed by coining. That is, the projecting ridge 34 is a portion formed by depressing the cover plate 3 on the upper surface (outer surface) side of the cover plate 3 into a recess, and raising the cover plate 3 on the lower surface (inner surface) side thereof into a projection. A recess 35 is formed on the upper surface (outer surface) of the cover plate 3 at a position corresponding to the position where the projecting ridge 34 is formed on the lower surface (inside) of the cover plate 3. The capacity of the recess 35 depressed on the upper surface of the cover plate 3 is substantially the same as the volume of the projecting ridge 34 raised on the lower surface of the cover plate 3. The projecting ridge 34 has a tip portion in the projecting direction with an arcuate cross section. This can suppress the generation of metal powder, etc., due to the abrasion between the projecting ridge 34 and the inner side of the case body 2 when the cover plate 3 is fitted into the case body 2.

Figure 7:
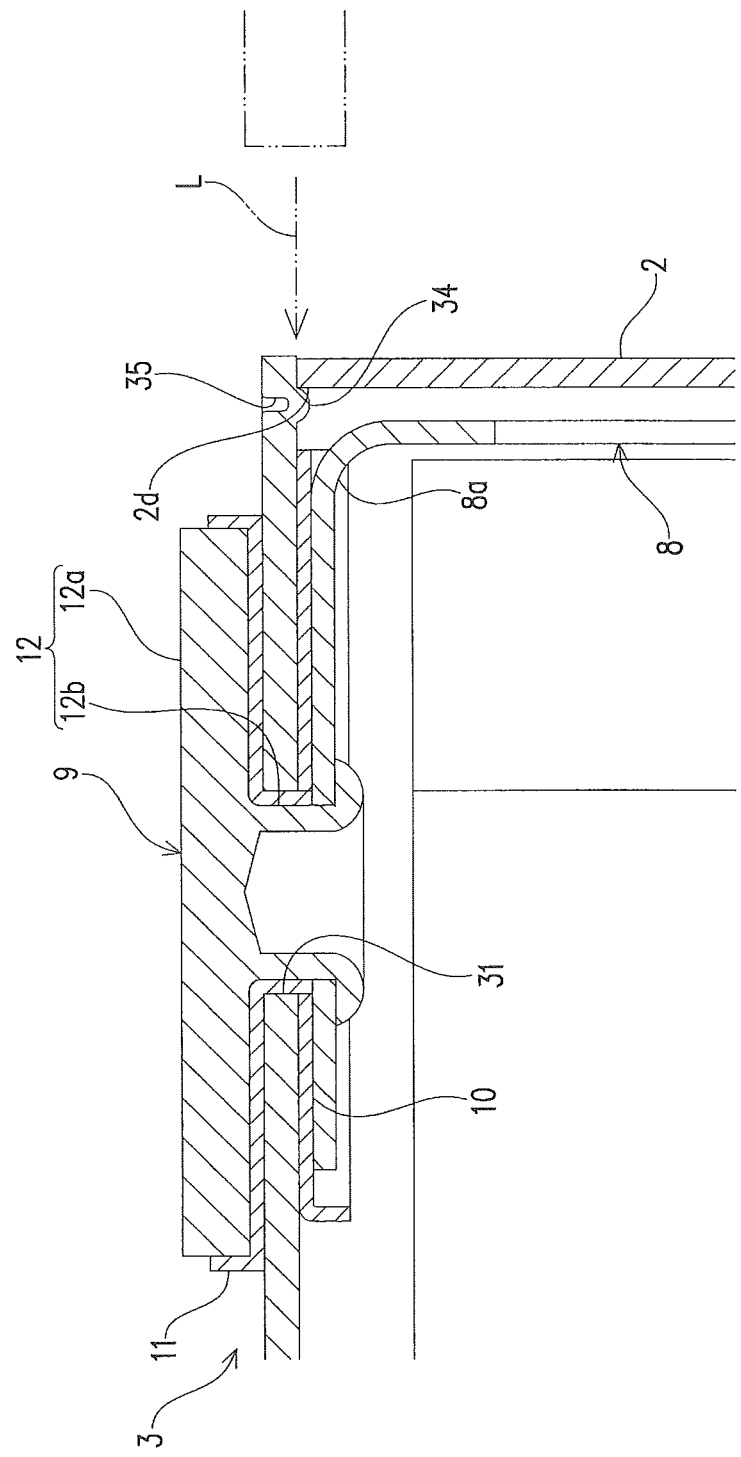
FIG. 7 is an enlarged sectional view of the cover plate of the battery cell when being placed on a case body.

As shown in FIG. 7, the projecting ridge 34 of the cover plate 3 that opposes the case body 2 is in abutting contact with the case body 2. As shown in FIG. 3, the projecting ridge 34 is provided on each of both ends in the longitudinal direction of the cover plate 3. Therefore, the cover plate 3 is positioned by the pair of projecting ridges 34 with respect to the case body 2.

As shown in FIG. 3, the electrode assembly 4 is formed by winding a strip-shaped positive electrode sheet 5 and a strip-shaped negative electrode sheet 6 with a strip-shaped separator 7 interposed therebetween into an elongated cylindrical shape that forms a circle elongated in the up-down direction about the rotation axis in the left-right direction. At this time, the positive electrode sheet 5 and the negative electrode sheet 6 are shifted from each other in the different directions to the left and right sides. The electrode assembly 4 is housed within the case 1 while being entirely covered by an insulating cover made of an insulating sheet so as to be insulated from the case 1. The positive electrode sheet 5 is formed of an aluminum foil on the surface of which a positive electrode active material is supported. The negative electrode sheet 6 is formed of a copper foil on the surface of which a negative electrode active material is supported. The positive electrode sheet 5 and the negative electrode sheet 6 have portions that are not coated with the active materials respectively at their end edges in the shift direction on the left and right sides. In this way, the aluminum foil and the copper foil are exposed at the left and right ends of the electrode assembly 4. That is, at the left and right ends of the electrode assembly 4, metal foils of the electrodes (portions of the electrodes to which no active materials are applied) are wound into a rolled bundle.

Further, a current collector 8 is electrically connected to each of the metal foils exposed at the left and right ends of the electrode assembly 4. The current collector 8 is an electrically conductive metal member elongated in the up-down direction. More specifically, the current collector 8 for the positive electrode, for example, is formed using aluminum or aluminum alloy. The current collector 8 for the negative electrode, for example, is formed using copper or copper alloy. An upper part of the current collector 8 is folded horizontally, as shown in FIG. 7, to serve as a connecting portion 8a. A portion of the current collector 8 that is lower than the connecting portion 8a is divided into two on the front and rear sides, which project downwardly. The portion divided into two is gripped by clip plates together with the end portion of the electrode assembly 4 so as to be connected and fixed to the end portion of the electrode assembly 4, for example, by ultrasonic welding.

As shown in FIG. 3 and FIG. 7, the terminal structure 9 includes the terminal structure 9 for the positive electrode and the terminal structure 9 for the negative electrode. Each terminal structure 9 includes a resin plate 10, an outer gasket (gasket) 11, and an external terminal 12. The resin plate 10 and the outer gasket 11 are arranged on each of the left and right sides of the cover plate 3 so as to surround the through holes 31 from the inner and outer sides. The external terminal 12 is inserted through the corresponding through hole 31 via the resin plate 10 and the outer gasket 11, and is electrically connected to the connecting portion 8a of the current collector 8. This allows the electrode assembly 4 within the case 1 and the external terminal 12 to be electrically connected to each other.

The external terminal 12 includes the external terminal 12 for the negative electrode and the external terminal 12 for the positive electrode. Each external terminal 12 has a head 12a and a stem 12b extending downwardly from the center on the lower surface of the head 12a. A bus bar is connected to the surface (exposed surface) of the head 12a by welding. The external terminal 12 for the negative electrode, for example, is formed using copper or copper alloy. The external terminal 12 for the positive electrode, for example, is formed using aluminum or aluminum alloy.

In production of a battery cell 1 with the above-described structure, the electrode assembly 4 in which the positive electrode sheet 5, the negative electrode sheet 6, the separator 7, and the current collector 8 are assembled is first housed within the case body 2 through the opening 2d of the case body 2. Subsequently, the cover plate 3 is placed on the opening edge of the opening 2d of the case body 2 at an appropriate position. At this time, the cover plate 3 is positioned by the projecting ridge 34 with respect to the opening 2d of the case body 2. The cover plate 3 is coupled to the case body 2 by laser welding over the entire circumference of the seam with the opening 2d of the case body 2. This allows the opening 2d of the case body 2 to be closed by the cover plate 3 so that the case 1 is sealed. After the case 1 is thus sealed, the outer gasket 11 is placed on the cover plate 3, and the external terminal 12 is inserted through an opening of the outer gasket 11, the through hole 31 of the cover plate 3, and an opening of the connecting portion 8a of the current collector 8 arranged within the case 1. Then, an external force is applied from the outside of the case 1 so that the tip portion of the external terminal 12 is crimped, thereby allowing the external terminal 12 and the electrode assembly 4 to be electrically connected to each other. As a result, the battery cell 1 is accomplished.

In this way, in the battery cell 1 according to this embodiment, when the cover plate 3 is placed on the opening edge of the opening 2d of the case body 2, the cover plate 3 is positioned at a specific position at the opening 2d of the case body 2 by the projecting ridge 34 of the cover plate 3. Specifically, when the cover plate 3 is placed on the opening edge of the opening 2d of the case body 2, the projecting ridge 34 of the cover plate 3 comes into contact with the inner side of the opening edge at its both ends in the second direction A2 of the opening 2d of the case body 2. Therefore, the cover plate 3 can be positioned in the second direction A2 of the opening 2d of the case body 2. Further, the projecting ridge 34 of the cover plate 3 is in contact also with the inner side of the opening edge at its both ends in the third direction A3 of the opening 2d of the case body 2. Therefore, the cover plate 3 can be positioned in the third direction A3 of the opening 2d of the case body 2.

The projecting ridge 34 is merely provided partially (locally) at portions in contact with the inner surface in the second direction A2 of the opening edge of the case body 2 and at portions in contact with the inner surface in the third direction A3 of the opening edge of the case body 2. Therefore, only a capacity equivalent to the volume of the projecting ridge 34 is lost partially from the capacity of the case 1, and thus the capacity inside the case is not significantly reduced.

Further, a gap may be formed between the lower surface of the cover plate 3 and the opening edge of the case body 2, for example, due to a margin of error in dimensional accuracy when producing the components or slight surface unevenness, in some cases. In the case 1 of this embodiment, the projecting ridge 34 of the cover plate 3 is arranged on the inner side via this gap as viewed from the outside of the case body 2. When the cover plate 3 and the opening edge of the case body 2 are coupled to each other by laser welding, even if the laser beam has passed through this gap, the projecting ridge 34 of the cover plate 3 blocks the way of the laser beam. This prevents the laser beam from reaching the inside of the case 1 over the projecting ridge 34. Therefore, it is possible to suppress the penetration of the laser beam into the contents of the case 1.

Further, since the projecting ridge 34 is formed by coining the cover plate 3, the weight of the cover plate 3 does not increase due to providing the projecting ridge 34. That is, when the projecting ridge 34 is provided on the cover plate 3, the weight of the cover plate 3 shall usually increase by the amount corresponding to the volume of the projecting ridge 34. However, since the recess 35 is provided on the cover plate 3 of this embodiment on the outer surface side of the portion where the projecting ridge 34 is provided, the weight equivalent to the capacity of the recess 35 is reduced from the weight of the cover plate 3. Accordingly, the penetration of the laser beam into the contents of the case 1 is suppressed by the projecting ridge 34, while the increase in the weight of the cover plate 3 due to providing the projecting ridge 34 on the cover plate 3 is suppressed by the recess 35. Further, the capacity inside the case 1 is not significantly reduced.

It should be noted that the electric storage device according to the present invention is not limited to the above-mentioned embodiments, and various modifications can be made without departing from the gist of the invention.

Figure 8:
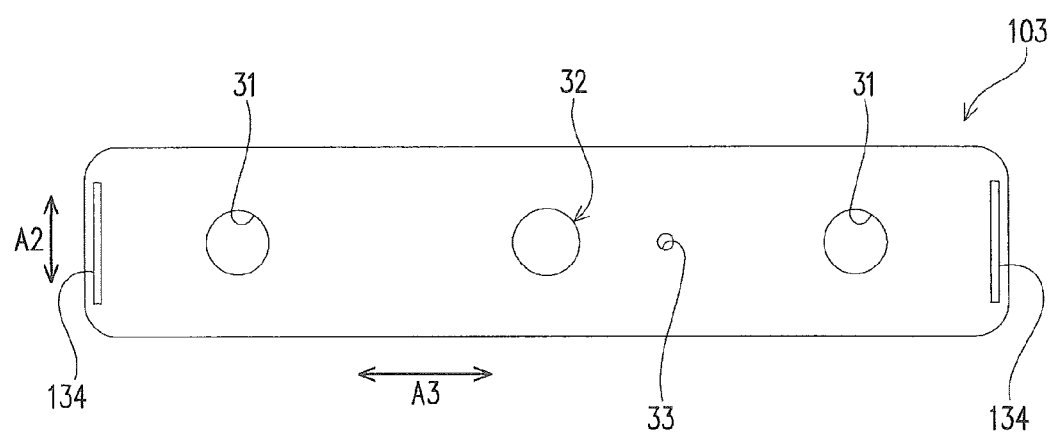
FIG. 8 is a bottom view of a cover plate according to another embodiment of the present invention.

For example, the above-mentioned embodiments describe an example in which the projecting ridge 34 is formed locally in the vicinity of the circumference edge of the cover plate 3 corresponding to the second sides P2 of the pair of end plates 2*c* and partially to the end portions of the second sides P2 of the pair of side plates 2*b*. However, this is not restrictive. For example, as shown in FIG. 8, projections 134 may be respectively formed corresponding only to the second sides of the pair of end plates 2*c*. That is, the projections 134 may be linear projecting ridges provided respectively along the short sides of a cover plate 103. The cover plate 103 is positioned in a direction intersecting the second sides of the pair of end plates 2*c* at the opening 2*d* of the case body 2, that is, in the third direction A3. Also in this embodiment, the projections 134 are formed locally in the vicinity of the circumferential edge of the cover plate 103 so as to be in contact with or adjacent to the inner surface of the opening edge of the case body 2. Therefore, the capacity inside the case 1 is not significantly reduced. Further, in the case where a gap is formed between the cover plate 103 and the pair of end plates 2*c* of the case body 2, there is an additional effect of preventing the penetration of the laser beam through the gap or into the inside of the case 1 over the projections 134.

Figure 9:
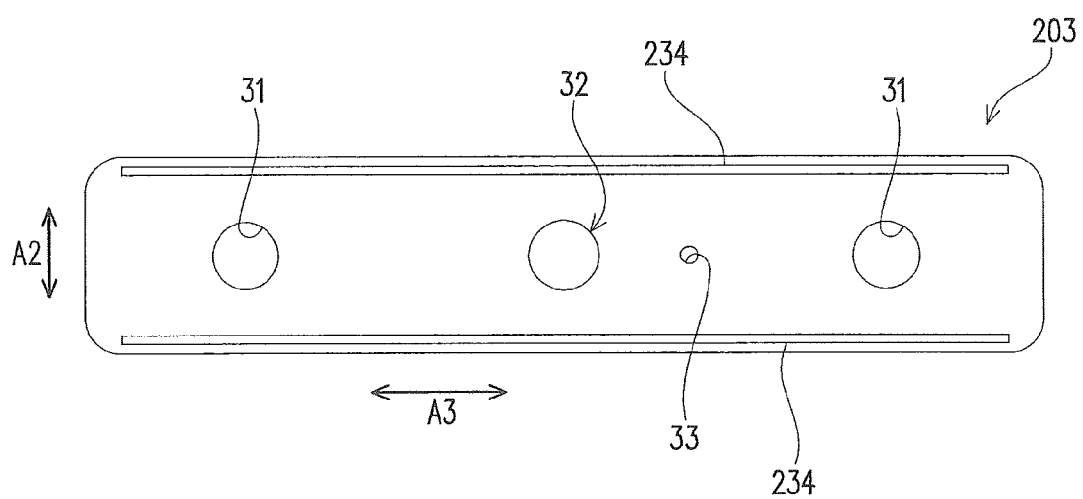
FIG. 9 is a bottom view of a cover plate according to still another embodiment of the present invention.

Further, as shown in FIG. 9, projections 234 may be respectively formed corresponding only to the second sides of the pair of side plates 2*b*. A cover plate 203 is positioned in a direction intersecting the second sides of the pair of side plates 2*b* at the opening 2*d* of the case body 2, that is, in the second direction A2. Also in this embodiment, the projections 234 are formed locally in the vicinity of the circumferential edge of the cover plate 203 so as to be in contact with or adjacent to the inner surface of the opening edge of the case body 2, and thus the capacity inside the case 1 is not significantly reduced. Further, in the case where a gap is formed between the cover plate 203 and the pair of side plates 2*b* of the case body 2, there is an additional effect of preventing the penetration of the laser beam through the gap into the inside of the case 1 over the projections 234.

Figure 10:
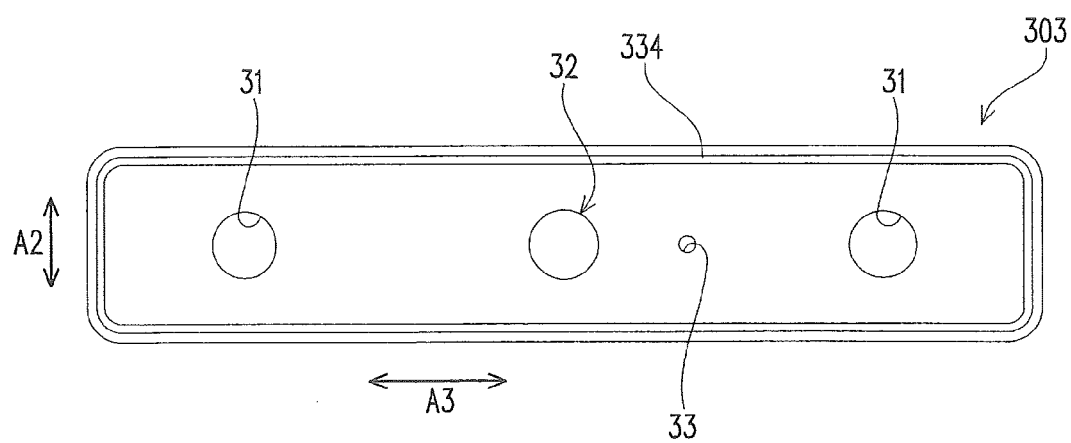
FIG. 10 is a bottom view of a cover plate according to still another embodiment of the present invention.

Further, as shown in FIG. 10, a projection 334 may be formed to have an annular shape that extends along the inner side of the opening edge of the case body 2. A cover plate 303 is positioned in both the second direction A2 and the third direction A3 with respect to the opening 2*d* of the case body 2. Also in this embodiment, the projection 334 is formed locally in the vicinity of the circumferential edge of the cover plate 303 so as to be in contact with or adjacent to the inner surface of the opening edge of the case body 2, and therefore the capacity inside the case 1 is not significantly reduced. Further, in the case where a gap is formed between the cover plate 303 and the case body 2, there is an additional effect of preventing the penetration of the laser beam through the gap or into the inside of the case 1 over the projection 334.

Figure 11:
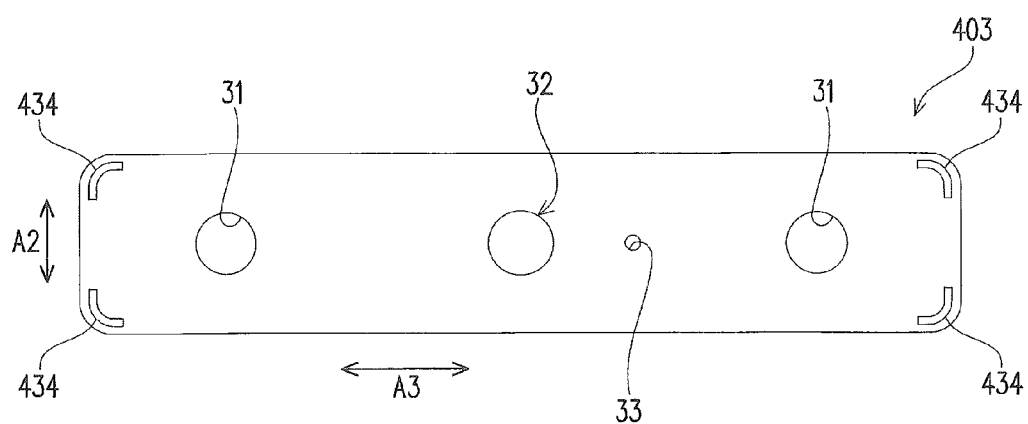
FIG. 11 is a bottom view of a cover plate according to still another embodiment of the present invention.

Further, as shown in FIG. 11, a plurality of projections 434 may be formed at positions corresponding to the connecting portions (the corners of the case body 2) of the opening edge of the case body 2 between the side plates 2*b* and the end plates 2*c*. The projections 434 are preferably formed at positions corresponding respectively to four corners of the case body 2. Such projections formed as above allow a cover plate 403 to be positioned in both the second direction A2 and the third direction A3 with respect to the opening 2*d* of the case body 2. Also in this embodiment, the projections 434 are formed locally in the vicinity of the circumferential edge of the cover plate 403 so as to be in contact with or adjacent to the inner surface of the opening edge of the case body 2, and therefore the capacity inside the case 1 is not significantly reduced.

Figure 12:
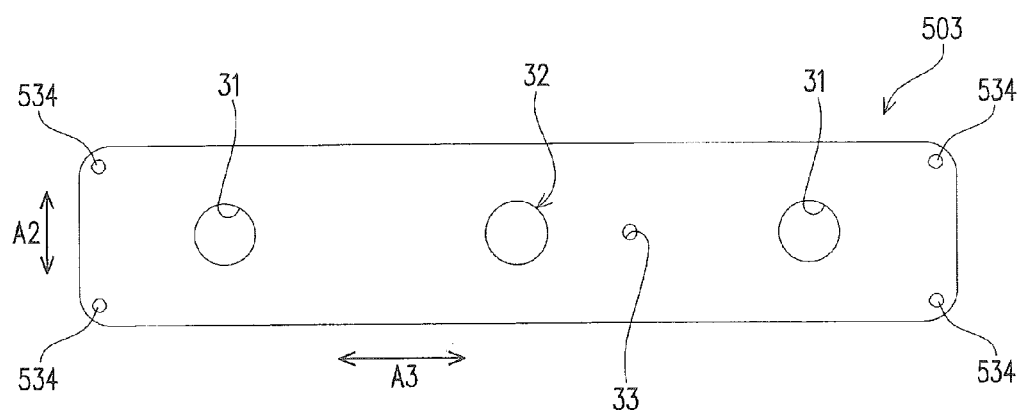
FIG. 12 is a bottom view of a cover plate according to still another embodiment of the present invention.
Figure 13:
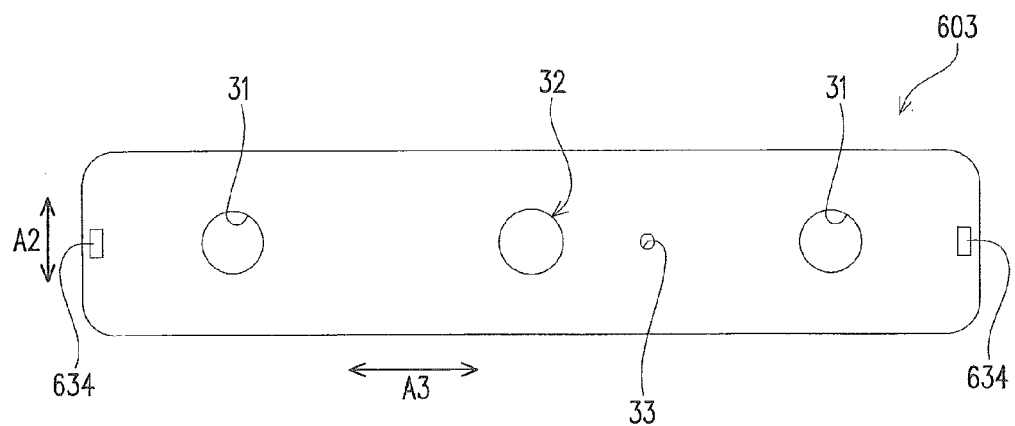
FIG. 13 is a bottom view of a cover plate according to still another embodiment of the present invention.

The above-mentioned embodiments describe an example in which the projection is the projecting ridge 34 that linearly projects from the cover plate 3. However, the projection may have any shape, as long as being insertable into the opening of the case body. For example, as shown in FIG. 12, a plurality of projections 534 may project in a cylindrical shape from a cover plate 503. Further, as shown in FIG. 13, two projections 634 may project from a cover plate 603 in a rectangular shape. Such projections formed as above also allow the cover plate 503, 603 to be positioned with respect to the opening 2*d* of the case body 2. Also in these embodiments, the projections 534, 634 are formed locally in the vicinity of the circumferential edge of the cover plate 503, 603 so as to be in contact with or adjacent to the inner surface of the opening edge of the case body 2, and therefore the capacity inside the case 1 is not significantly reduced.

Figure 14:
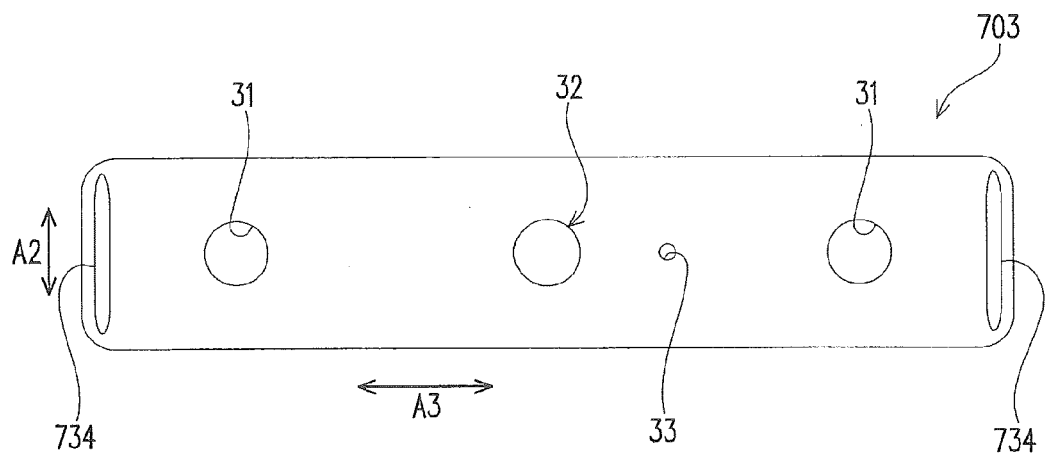
FIG. 14 is a bottom view of a cover plate according to still another embodiment of the present invention.
Figure 15:
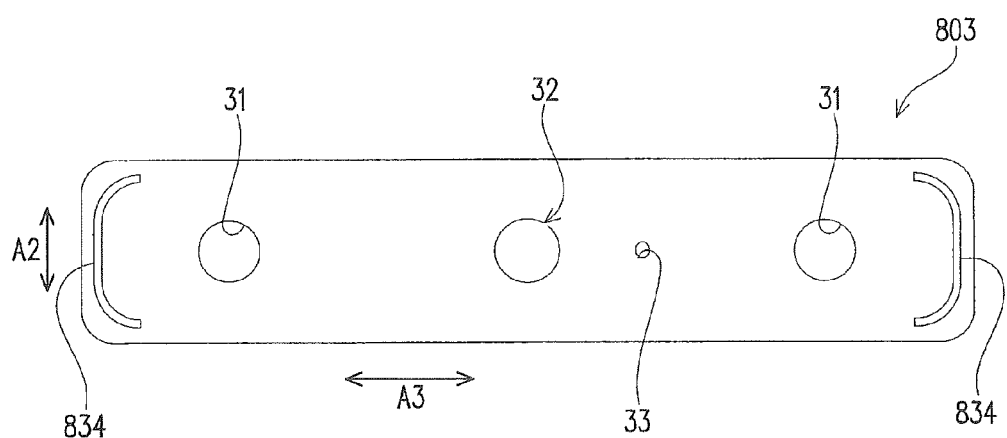
FIG. 15 is a bottom view of a cover plate according to still another embodiment of the present invention.

Further, as shown in FIG. 14, projections 734 do not need to be in abutting contact with or adjacent to the inner circumferential surface of the opening 2*d* of the case body 2 in the entire area of one side of the opening edge of the case body 2, and only need to be in abutting contact with or adjacent to the inner circumferential surface of the opening 2*d* of the case body 2 in a portion of the one side. That is, the projections 734 do not need to be continuously in abutting contact with or adjacent to the inner circumferential surface in such a manner that both ends thereof reach the end plates 2*c* at the opening 2*d* of the case body 2. Alternatively, as shown in FIG. 15, projections 834 may have a shape such that the portions between both ends and the center portions of the projections 834 that correspond respectively to the corners of the opening 2*d* are not in abutting contact with or adjacent to the corners, while both ends of the projections 834 are in abutting contact with or adjacent to the side plates 2*b* at the opening 2*d* of the case body 2, and the center portions of the projections 834 are in abutting contact with or adjacent to the end plates 2*c*. The projections 734, 834 with such a shape make it easy to form the projections 734, 834 on the cover plate 703, 803 while allowing the cover plate 703, 803 to be positioned with respect to the opening 2*d* of the case body 2. Also in these embodiments, the projections 734, 834 are formed locally in the vicinity of the circumferential edge of the cover plate 703, 803 so as to be in contact with or adjacent to the inner surface of the opening edge of the case body 2, and therefore the capacity inside the case 1 is not significantly reduced.

Figure 16:
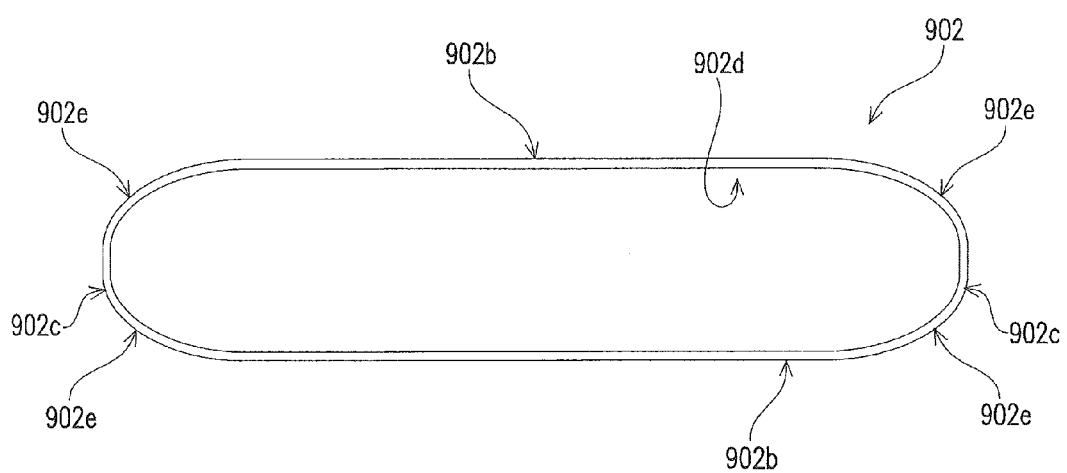
FIG. 16 is a top view of a case body according to still another embodiment of the present invention.
Figure 17:
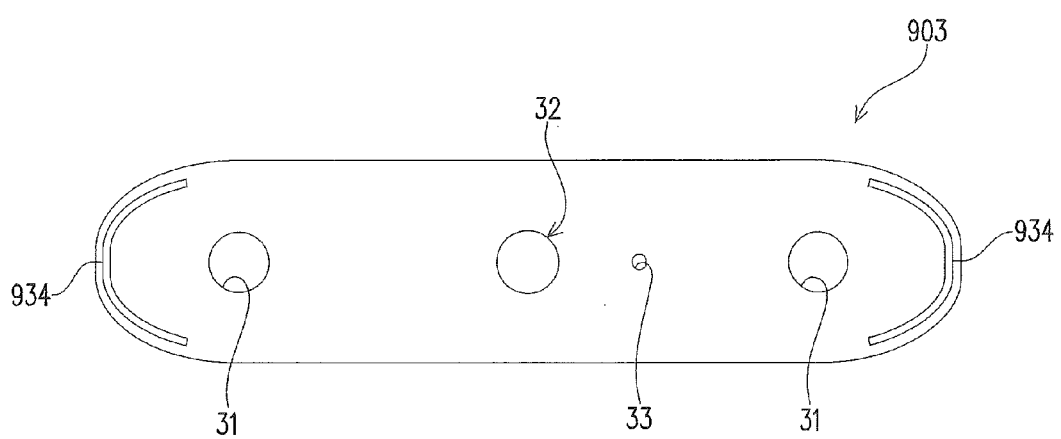
FIG. 17 is a bottom view of a cover plate according to the embodiment.

The above-mentioned embodiments describe an example in which the case body 2 has a bottomed quadrangular tubular shape, and the cover plate 3 is a rectangular plate member. That is, an example in which the case 1 has a quadrangular box shape is indicated. However, as shown in FIG. 16, the present invention can be applied to a case body 902 having a rectangular shape such that an opening edge 902*d* has a plurality of corner portions 902*e*, and a plurality of sides 902*b* and 902*c* that connect adjacent corner portions 902e. The plurality of sides 902b correspond to the side plates 2b in the above-mentioned embodiments. The plurality of sides 902c correspond to the end plates 2c in the above-mentioned embodiments. In the case of the case body 902 having such a rectangular shape that includes the corner portions 902e, a pair of projections 934 are each provided in a cover plate 903 so as to be in contact with or adjacent to two adjacent corner portions 902e and the side 902c between the corner portions 902e, as shown in FIG. 17. The pair of projections 934 are each formed along the two adjacent corner portions 902e and the side 902c between the corner portions 902e. That is, the projections 934 are each formed into a so-called C shape. When the cover plate 903 is placed on the opening edge of the opening 902d of the case body 902, the plurality of projections 934 formed as above are in contact with or adjacent to the plurality of corner portions 902e of the opening edge of the case body 902. Therefore, the cover plate 903 is positioned with respect to the opening 902d of the case body 902. Also in this embodiment, the projections 934 are merely formed at a position corresponding to at least one of the plurality of corner portions 902e of the opening 902d of the case body 902. In this way, the projections 934 are formed locally in the vicinity of the circumferential edge of the cover plate 903 so as to be in contact with or adjacent to the inner surface of the opening edge of the case body 2, and therefore the capacity inside the case is not significantly reduced.

Figure 18:
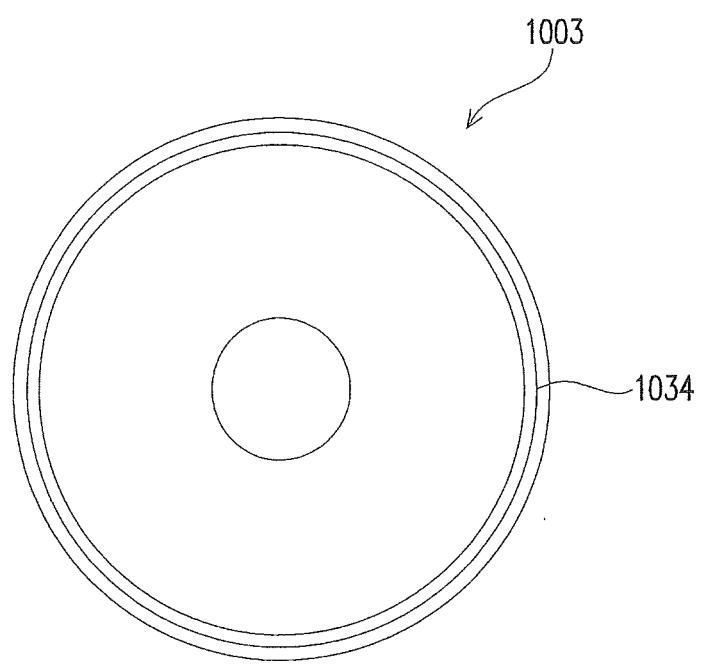
FIG. 18 is a bottom view of a cover plate according to still another embodiment of the present invention.
Figure 19:
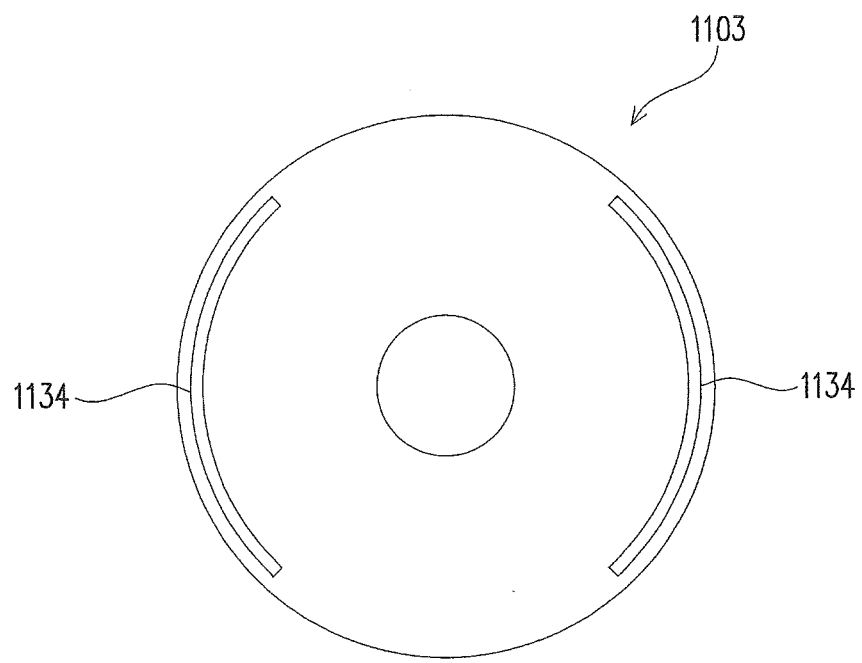
FIG. 19 is a bottom view of a cover plate according to still another embodiment of the present invention.

The present invention can be applied to a case in which a case body has a bottomed cylindrical shape, and a cover plate 1003, 1103 is a circular plate member that closes the opening of the case body, as shown in FIG. 18 and FIG. 19. In this case, as shown in FIG. 18, a projection 1034 having an annular shape may be provided on the cover plate 1003 so as to oppose the entire inner circumference of the case body. Further, as shown in FIG. 19, projections 1134 may be provided on a cover plate 1103 so as to each have an arcuate shape that opposes a portion at the opening of the case body. The cover plate 1003, 1103 is positioned with respect to the opening of the case body by such a projection 1034, 1134. Also in these embodiments, such a projection 1034, 1134 is formed locally in the vicinity of the circumferential edge of the cover plate 1003, 1103 so as to be in contact with or adjacent to the inner surface of the opening edge of the case body. Therefore, the capacity inside the case is not significantly reduced. Further, in the case where a gap is formed between the cover plate 1003, 1103 and the case body, there is an additional effect of preventing the penetration of the laser beam through the gap into the inside of the case over the projection 1034, 1134.

Figure 20:
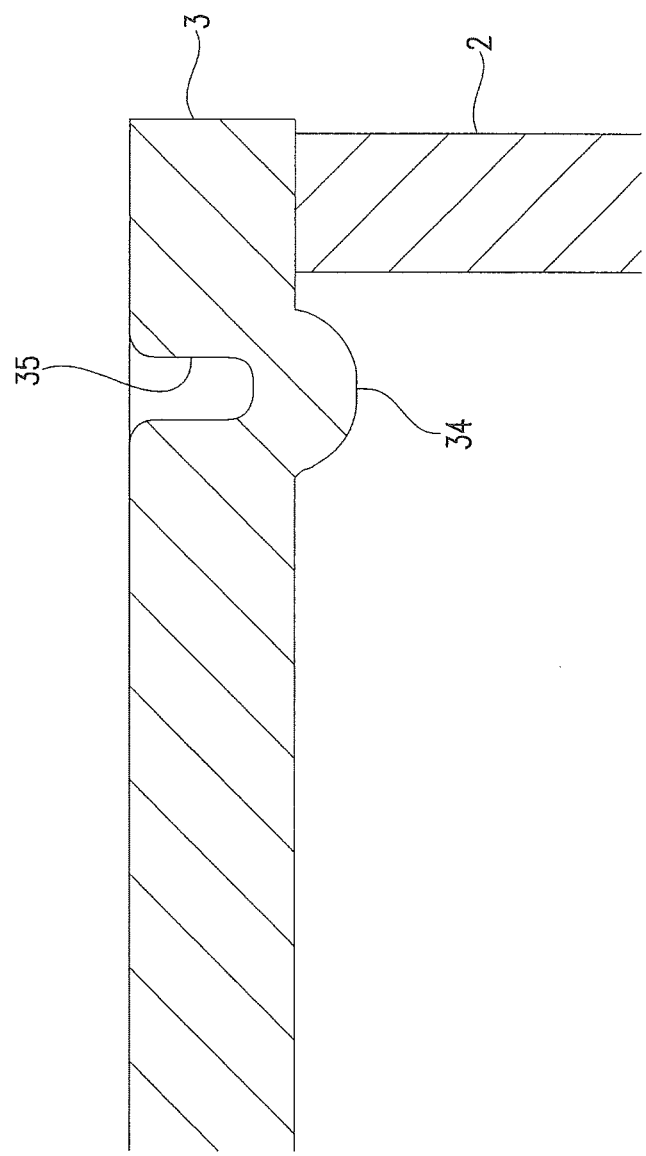
FIG. 20 is an enlarged sectional view of a joint portion between a case body and a cover plate according to still another embodiment of the present invention.

Further, the above-mentioned embodiments describe an example in which the projecting ridge 34 (projection) is in contact with the inner surface of the opening edge of the case body 2 at least in the second direction A2 (or the third direction A3), which is orthogonal to the first direction A1. However, as shown in FIG. 20, the projecting ridge 34 (projection) may be adjacent to the inner surface of the opening edge of the case body 2 at least in the second direction A2 (or the third direction A3), which is orthogonal to the first direction A1. Also in this case, there are effects of not only allowing the cover plate 3 to be positioned with respect to the case body 2, as in the case of being in contact, but also facilitating the insertion of the cover plate 3 into the case body 2.

Further, an example in which the current collector 8 for the positive electrode and the external terminal 12 for the positive electrode are formed using aluminum or aluminum alloy, and the current collector 8 for the negative electrode and the external terminal 12 for the negative electrode are formed using copper or copper alloy has been described above. However, the materials for the current collectors 8 and the external terminals 12 are arbitrarily selected as long as being an electrically conductive metal material corresponding to the type of the battery cell. Further, the above-mentioned embodiments also exemplify the materials for the external terminals 12. However, the materials for the external terminals 12 are arbitrarily selected as long as being an electrically conductive metal material that has suitable properties such as strength and conductivity.

Further, the electrode assembly 4 is not limited to those of a wound type with an elongated cylindrical shape, as in the above-mentioned embodiments. The electrode assembly may have another shape. The electrode assembly, for example, may be of a stack type in which a plurality of positive electrode sheets and a plurality of negative electrode sheets are alternately stacked via separators.

Further, the above-mentioned embodiments describe an example in which the case 1 is formed using aluminum alloy, steel, or the like. However, the material for the case 1 (the case body 2 and the cover plate 3) is arbitrarily selected. Accordingly, materials other than metal may be used for the case 1. For example, an insulating material can be used as the material for the case 1. Further, the shape and the structure of the case 1 (the case body 2 and the cover plate 3) are also not limited to the above-mentioned embodiments, and are arbitrarily selected.

Further, the above-mentioned embodiments describe an example in which the case body 2 and the cover plate 3 are coupled to each other by laser welding. However, the method for coupling the case body 2 and the cover plate 3 is arbitrarily selected. Examples of the method for coupling the case body 2 and the cover plate 3 include a coupling method by resistance welding and a coupling method using an adhesive.

Further, the above-mentioned embodiments describe a lithium ion secondary battery cell. However, the type or the size (capacity) of the battery cell is arbitrarily selected.

Further, the present invention is not limited to the lithium ion secondary battery cell. The present invention can be applied also to primary battery cells and capacitors such as electric double layer capacitors, in addition to various secondary battery cells.

Figure 21:
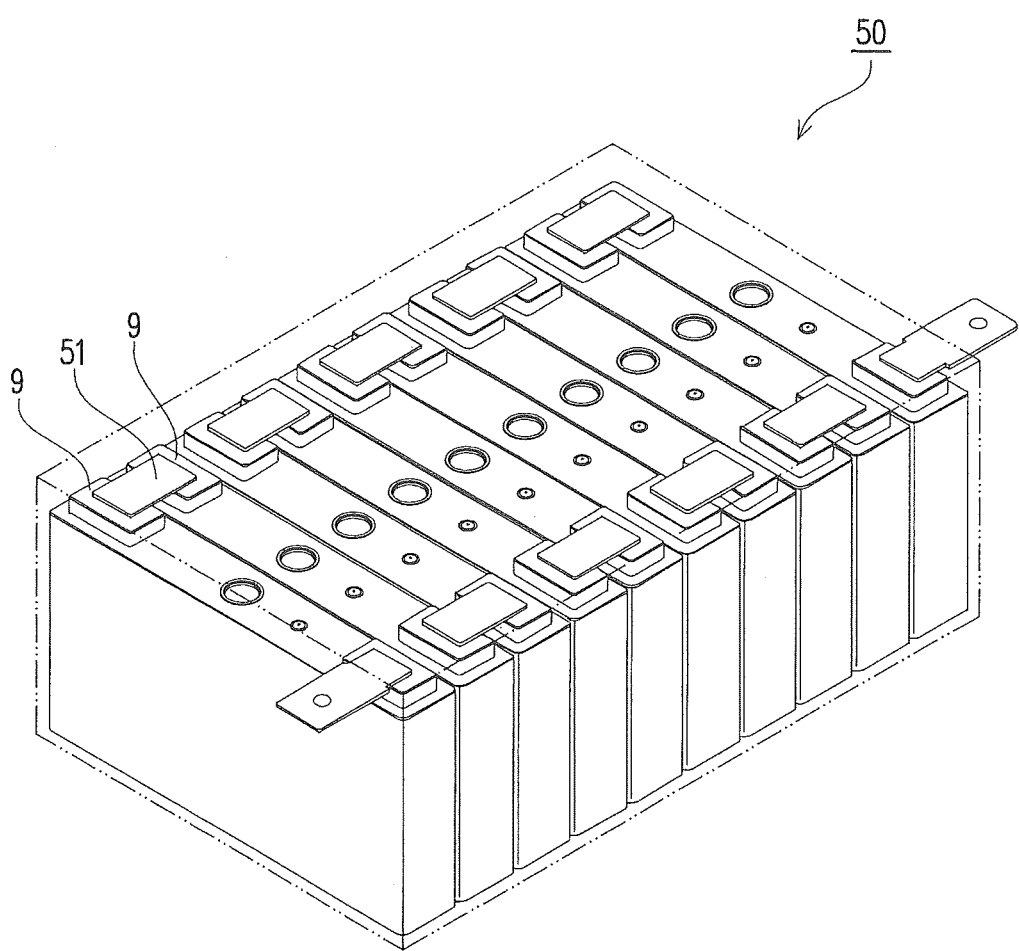
FIG. 21 is a perspective view of an electric storage apparatus including the electric storage device according to the present invention.

The electric storage device (for example, a battery cell) may be used for an electric storage apparatus (a battery module in the case where the electric storage device is a battery cell) 50, as shown in FIG. 21, including a plurality of electric storage devices or an electric storage device assembly including a plurality of electric storage devices. This electric storage apparatus 50 has at least two electric storage devices and a bus bar member 51 that electrically connects the two (different) electric storage devices to each other. Further, the electric storage apparatus includes a coupling member that couples the at least two electric storage devices to each other. In this electric storage apparatus, the technique of the present invention needs to be applied only to at least one of the electric storage devices.

REFERENCE SIGN LIST

1 Case
2 Case Body
2a Bottom
2b Side Plate
2c End Plate
2d Opening

3 Cover Plate
31 Through Hole
32 Gas Discharge Valve
33 Injection Hole
34 Projecting Ridge (Projection)
35 Recess
3 Case Inner Side Portion
4 Electrode Assembly
5 Positive Electrode Sheet
6 Negative Electrode Sheet
7 Separator
8 Current Collector
8a Connecting Portion
9 Terminal Structure
10 Resin Plate
11 Outer Gasket
12 External Terminal
12a Head
12b Stem
13 Stopper
103 Cover Plate
134 Projection
203 Cover Plate
234 Projection
303 Cover Plate
334 Projection
403 Cover Plate
434 Projection
503 Cover Plate
534 Projection
603 Cover Plate
634 Projection
703 Cover Plate
734 Projection
803 Cover Plate
834 Projection
902 Case Body
902b Side Plate
902c End Plate
902d Opening
902e Corner Portion
903 Cover Plate
934 Projection
1003 Cover Plate
1034 Projection
1103 Cover Plate
1134 Projection
50 Electric Storage Apparatus
51 Bus Bar Member
A1 First Direction
A2 Second Direction
A3 Third Direction
P1 First Side
P2 Second Side
P3, P4 Side

What is claimed is:

1. An electric storage device comprising:
an electrode assembly comprising a positive electrode plate and a negative electrode plate that are insulated from each other; and
a case that houses the electrode assembly, wherein
the case comprises a case body having an opening in a first direction, and a cover plate that is placed on an opening edge of the opening of the case body so as to cover the opening,
the cover plate comprises a projection that is inserted into the opening of the case body, and
the projection is in contact with or adjacent to an inner surface of the opening edge of the opening of the case body at least in a second direction, which is orthogonal to the first direction, and is locally located in a vicinity of a circumferential edge of the cover plate,
wherein the projection comprises a plurality of projection ridges including a linear shape and a U-shaped cross-section, and comprising:
a first projection ridge which is formed at a first end of the cover plate; and
a second projection ridge which is formed at a second end of the cover plate opposite the first end, and is separated from the first projection ridge, and
wherein an upper surface of the cover plate comprises a recess at a location opposite the projection, a depth of the recess being less than a thickness of the cover plate.

2. The electric storage device according to claim 1, wherein
the case body has a bottomed quadrangular tubular shape, and
the projection is at least partially in contact with or adjacent to each of a pair of opposed sides of the opening edge of the case body.

3. The electric storage device according to claim 2, wherein
the projection is at least partially in contact with or adjacent to each of one pair of opposed sides of the opening edge of the case body and each of the other pair of opposed sides thereof.

4. The electric storage device according to claim 1, wherein
the case body has the opening edge of a rectangular shape having a plurality of corner portions, and a plurality of sides that connect between adjacent ones of the plurality of corner portions, and the projection is in contact with or adjacent to at least one of the plurality of corner portions.

5. The electric storage device according to claim 1, wherein
the projection has an annular shape that extends along the opening edge of the case body.

6. The electric storage device according to claim 1, wherein
the projection has an outer circumferential edge spaced at a distance from the inner surface of the opening edge.

7. The electric storage device according to claim 1, wherein
the projection has an outer circumferential edge spaced at a distance from the circumferential edge of the cover plate in plan view.

8. The electric storage device according to claim 1, wherein
the projection is in contact with or adjacent to a portion of the inner surface of the opening edge of the case body rather than an entirety of the inner surface of the opening edge of the case body.

9. The electric storage device according to claim 1, wherein
the recess overlaps with the projection in plan view.

10. The electric storage device according to claim 1, wherein
the projection has a linear shape that extends along the opening edge of the case body.

11. The electric storage device according to claim 1, wherein
the projection has a tip in the projecting direction with an arcuate cross section.

12. An electric storage apparatus comprising:
at least two electric storage devices comprising at least one electric storage device according to claim 1; and
a coupling member that couples the at least two electric storage devices to each other.

13. An electric storage device comprising:
an electrode assembly comprising a positive electrode plate and a negative electrode plate that are insulated from each other; and
a case that houses the electrode assembly, wherein
the case comprises a case body having an opening, and a cover plate that is placed on an opening edge of the opening of the case body so as to cover the opening,
the cover plate comprises a projection that projects from the lower surface of the cover plate,
the projection is in contact with or adjacent to an inner surface of the opening edge of the case body, and
the projection has an outer circumferential edge spaced at a distance from the circumferential edge of the cover plate, and
wherein the projection comprises a plurality of projection ridges including a linear shape and a U-shaped cross-section, and comprising:
a first projection ridge which is formed at a first end of the cover plate; and
a second projection ridge which is formed at a second end of the cover plate opposite the first end, and is separated from the first projection ridge, and
wherein an upper surface of the cover plate comprises a recess at a location opposite the projection, a depth of the recess being less than a thickness of the cover plate.

14. The electric storage device according to claim 13, wherein
the projection has an outer circumferential edge spaced at a distance from the inner surface of the opening edge.

15. The electric storage device according to claim 13, wherein
the projection is in contact with or adjacent to a portion of the inner surface of the opening edge of the case body rather than an entirety of the inner surface of the opening edge of the case body.

16. The electric storage device according to claim 13, wherein
the recess overlaps with the projection in plan view.

17. The electric storage device according to claim 13, wherein
the projection has a linear shape that extends along the opening edge of the case body.

18. The electric storage device according to claim 13, wherein
the projection has a tip in the projecting direction with an arcuate cross section.

19. An electric storage apparatus comprising:
at least two electric storage devices comprising at least one electric storage device according to claim 13; and
a coupling member that couples the at least two electric storage devices to each other.

20. The electric storage device according to claim 1, wherein the first and second projection ridges comprise:
a short-side portion extending along a short side of the cover plate; and
a long-side portion bent from opposing ends of the short-side portion to extend along a long side of the cover plate.

21. The electric storage device according to claim 1, wherein the projection is spaced apart from the electrode assembly.

22. The electric storage device according to claim 1, wherein the first and second projection ridges include a tip portion in a projecting direction with an arcuate cross section.

23. The electric storage device according to claim 1, wherein the cover plate is positioned on the opening of the case body in the second direction and the third direction by the first and second projection ridges.

24. The electric storage device according to claim 1, further comprising:
a current collector connected to the electrode assembly, the projection being formed between the current collector and a side of the case body, in a plan view.

25. The electric storage device according to claim 24, wherein the current collector includes a connecting portion formed between the electrode assembly and the cover plate, a bottommost surface of the projection being formed above an uppermost surface of the connecting portion.

26. The electric storage device according to claim 25, further comprising:
a gasket formed between the connecting portion and the current collector, the projection being formed between the gasket and the side of the case body.

* * * * *